C. J. Fox,
Water Wheel.
No. 112,028. Patented Feb. 21, 1871.
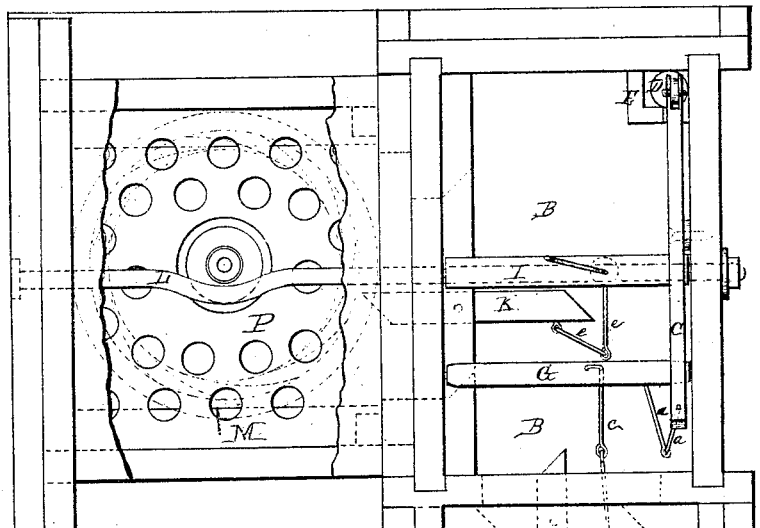
Fig. 1.
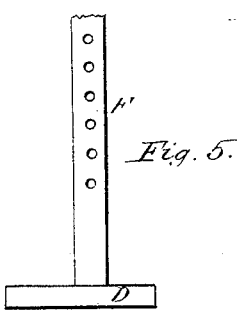
Fig. 5.
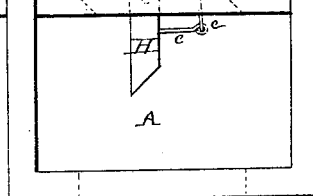
Fig. 2.
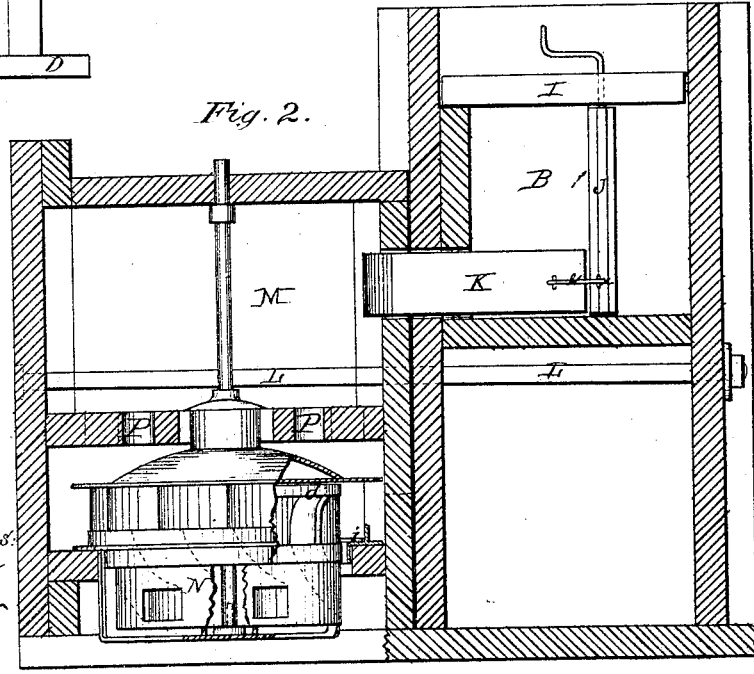
Witnesses:
F. Lehmann
Chas. Johnson
Inventor
C. J. Fox C. J. Fox, Water Wheel.

No. 112,028. Patented Feb. 21, 1871.

United States Patent Office.

CHARLES JAMES FOX, OF CHARLOTTE, NORTH CAROLINA.

Letters Patent No. 112,028, dated February 21, 1871.

IMPROVEMENT IN WATER-WHEELS.

The Schedule referred to in these Letters Patent and making part of the same.

*To all whom it may concern:*

Be it known that I, CHARLES JAMES FOX, of Charlotte, North Carolina, have invented certain new and useful Improvements in Water-Wheels, of which the following is a specification.

The nature of my invention consists in—

First, the arrangement of a float-valve in the flume, which is attached to the gate of the fore-bay in such a manner that the flow or pressure of the water upon the wheel can be regulated automatically to any desired degree.

Secondly, in a box or frame, in which the wheel is placed, and which is pivoted to the side of the flume in such a manner that it can be turned upon one of its sides, carrying the wheel with it, so as to change the shaft of the wheel from a vertical to a horizontal position, and *vice versa*.

Thirdly, in the peculiar construction of the wheel itself, as will hereafter be more fully set forth.

In the accompanying drawing—

Figure 1 represents a plan view of my invention.

Figure 2 is a part section of the same.

Figure 5 is a side view of the float-valve.

A represents the fore-bay, at which the water enters; and

B, the flume.

Pivoted to one side of the flume is a lever, C, to one end of which is attached a float-valve, D, placed in a box-like compartment, E, in one corner.

This box has an opening in its side near the bottom, so that, as the water enters the flume, it will rise equally in both.

The stem F, to which the valve D is attached, is graduated to a scale, as seen in fig. 5, so that the speed or velocity of the wheel is automatically regulated.

To the opposite end of the lever C is attached, by means of the bars *a*, a revolving rod or lever, G, which, in turn, is attached to the gate H, leading from the fore-bay, by means of the bars *c*.

When the water is turned into the flume it rises in the box E until it reaches the float D, which, having been set to a certain number of revolutions of the wheel per minute, begins to rise, and, relieving the lever C of its weight, making the water by its pressure to close the gate until just an even quantity of water is admitted. Should it close the gate too much, then the water will sink, carrying the float with it, so that its weight will again open it.

Extending across the flume is a bar, I, which serves as a bearing for the upright lever J, to which the flume-gate K is attached by means of the bars *e*.

Pivoted to the side of the flume, by means of the long rod L, is the frame or box M, in which is placed the water-wheel N.

Figure 3:
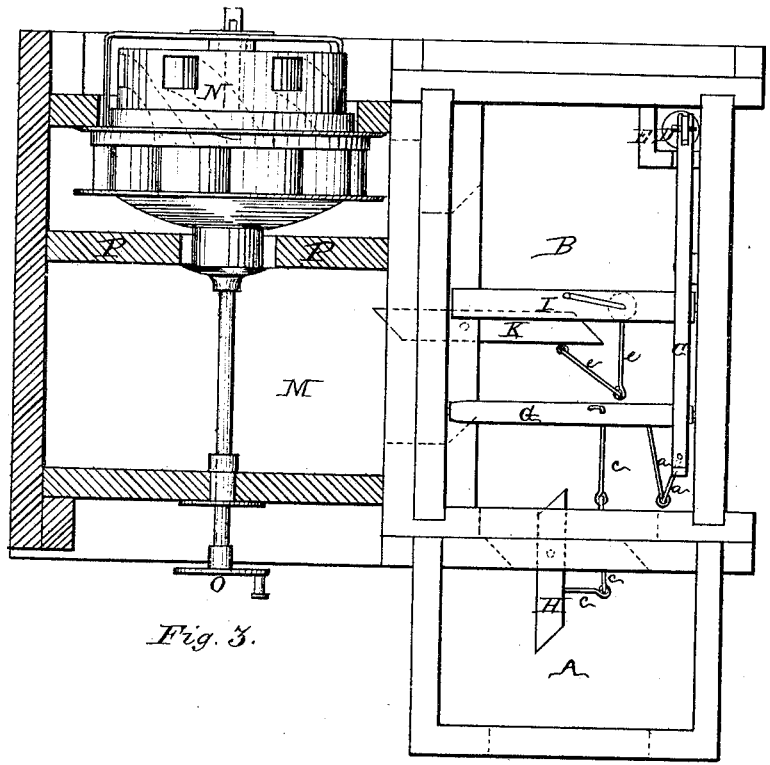
Figure 3 is a plan view, showing the wheel-case turned upon its side, so that its shaft works in a horizontal position.
Figure 4:
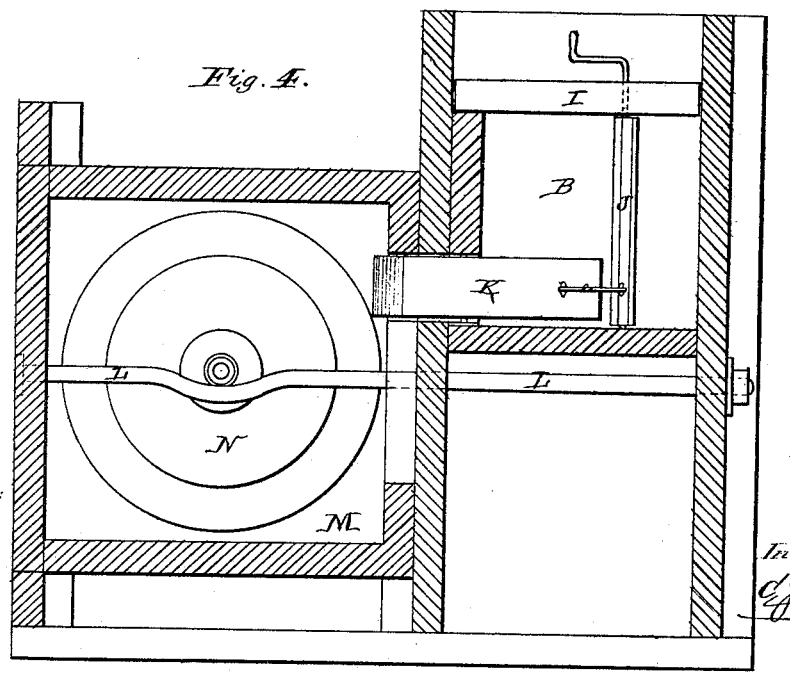
Figure 4 is a part-section view, showing the mechanism attached to the flume-gate.

This frame, turning upon the rod L as a pivot, can be placed in two positions—one vertical, as shown in fig. 1, and the other horizontal, as shown in fig. 3, changing the position of the wheel in a corresponding degree.

For instance, if I desire to use the shaft to turn a grist-mill of any kind, I use it in a vertical position; but should I desire to apply the power of the wheel for running a saw-mill, I turn the box upon its side, which, bearing the wheel with it, changes the shaft of the wheel from a vertical to a horizontal position, as shown in fig. 3.

I then attach a crank, O, and place a journal upon each end of the shaft, and the wheel is ready to be attached directly to the saw without gearing.

In the frame M, bearing directly upon the top of the water-wheel, is a perforated screen, P, which serves to catch all pieces of wood or chunks which may be in the water, so as to prevent them from injuring the wheel. This screen, together with the hydraulic pressure bearing upon the top of the wheel, serves to hold it firmly upon its seat.

Resting in a common step is my water-wheel N, having an ordinary case, provided with chutes, placed upon its top.

This wheel consists of a cylinder cast in one piece, and having radial arms extending toward the center so as to grasp the shaft.

My buckets are formed in the side of this cylinder, as shown in fig. 2, and are open at their tops so as to receive the water from the chutes, then extend downward and backward one quarter of a circle to where they discharge, their lower parts being covered over so as to retain the water.

By making my buckets in this manner I obtain all the advantages which the water can give, viz., concussion, where the water strikes; pressure, as it bears downward and backward; and reaction, where it discharges.

Just at the top of the wheel, and extending over the buckets, is a flange, *a*, against which the upward pressure of the water bears, so as to lift it up from its seat.

Should the wheel at any time leak I take off the top case, cut a number of pieces of leather, *i*, so as to make a packing, fit them to the wheel, put on the case again, and the leakage is stopped.

It will be noticed that the water is received upon its outside, is retained on the outside, and is discharged upon the outside.

Having thus described my invention, what I claim as new, and desire to secure by Letters Patent, is—

1. The reversible case or frame in which the water-wheel is placed, so adapted that the shaft of the wheel can be changed from a vertical to a horizontal position by the means substantially as described.

2. The water-wheel N, consisting of a cylinder having the buckets formed in its side and partly inclosed, so that the water will be received, retained, and discharged on the outside, at the furthest point from the center, substantially as shown.

3. The combination of the float-valve D, levers C and G, and connecting-bars $a\ c$, when so arranged as to open and permit the closing of the gate, substantially as specified.

4. In combination with the float-valve and its levers, the screen P, case M, rod L, and wheel N, when all are arranged as described.

C. J. FOX.

Witnesses:
F. LEHMANN,
CHAS. JOHNSON.